(12) United States Patent
Guo et al.

(10) Patent No.: US 11,646,156 B2
(45) Date of Patent: *May 9, 2023

(54) DIELECTRIC CERAMIC COMPOSITION AND CERAMIC CAPACITOR USING THE SAME

(71) Applicant: KEMET Electronics Corporation, Fort Lauderdale, FL (US)

(72) Inventors: Hanzheng Guo, Simpsonville, SC (US); Abhijit Gurav, Simpsonville, SC (US)

(73) Assignee: KEMET Electronics Corporation, Fort Lauderdale, FL (US)

(*) Notice: Subject to any disclaimer, the term of this patent is extended or adjusted under 35 U.S.C. 154(b) by 119 days.

This patent is subject to a terminal disclaimer.

(21) Appl. No.: 17/467,995

(22) Filed: Sep. 7, 2021

(65) Prior Publication Data

US 2022/0076886 A1  Mar. 10, 2022

Related U.S. Application Data

(60) Provisional application No. 63/076,444, filed on Sep. 10, 2020.

(51) Int. Cl.
*H01G 4/12* (2006.01)
*C04B 35/50* (2006.01)
*H01G 4/30* (2006.01)
*C04B 35/495* (2006.01)
*C04B 35/465* (2006.01)
*H01G 4/40* (2006.01)

(52) U.S. Cl.
CPC ......... *H01G 4/1245* (2013.01); *C04B 35/465* (2013.01); *C04B 35/495* (2013.01); *C04B 35/50* (2013.01); *H01G 4/1227* (2013.01); *H01G 4/30* (2013.01); *H01G 4/306* (2013.01); *H01G 4/40* (2013.01); *C04B 2235/66* (2013.01)

(58) Field of Classification Search
None
See application file for complete search history.

(56) References Cited

U.S. PATENT DOCUMENTS

| | | | |
|---|---|---|---|
| 6,627,570 B2 * | 9/2003 | Fukui | C04B 35/47 361/321.2 |
| 7,923,395 B2 * | 4/2011 | Randall | C04B 35/49 501/135 |
| 9,627,134 B2 | 4/2017 | Park et al. | |
| 2002/0000825 A1 | 1/2002 | Sirane et al. | |
| 2003/0125192 A1 * | 7/2003 | Moon | C04B 35/49 501/135 |
| 2006/0229188 A1 * | 10/2006 | Randall | C04B 35/64 501/136 |

(Continued)

OTHER PUBLICATIONS

ISA/US; ISR and Written Opinion prepared for PCT/US2021/049221; Applicant: KEMET Electronics Corporation; dated Feb. 7, 2022.

*Primary Examiner* — Dion R. Ferguson
(74) *Attorney, Agent, or Firm* — Joseph T. Guy; Patent Filing Specialist Inc.

(57) ABSTRACT

A dielectric ceramic composition comprising a main component comprising an oxide represented by:

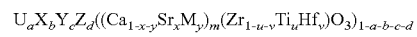

$$U_a X_b Y_c Z_d ((Ca_{1-x-y} Sr_x M_y)_m (Zr_{1-u-v} Ti_u Hf_v) O_3)_{1-a-b-c-d}$$

wherein the elements defined by U, X, Y, Z and M and subscripts a, b, c, d, x, y, m, u and v are defined.

45 Claims, 2 Drawing Sheets

(56) References Cited

U.S. PATENT DOCUMENTS

| | | | |
|---|---|---|---|
| 2008/0107800 A1* | 5/2008 | Randall | C04B 35/64 427/79 |
| 2009/0207555 A1 | 8/2009 | Hackenberger et al. | |
| 2015/0070238 A1 | 3/2015 | Rochemont et al. | |
| 2018/0166219 A1* | 6/2018 | Noda | C03C 14/006 |
| 2022/0076892 A1* | 3/2022 | Bultitude | H01G 4/30 |

* cited by examiner

DIELECTRIC CERAMIC COMPOSITION AND CERAMIC CAPACITOR USING THE SAME

CROSS-REFERENCE TO RELATED APPLICATIONS

This application claims priority to U.S. Provisional Appl. No. 63/076,444 filed Sep. 10, 2020 which is incorporated herein by reference.

FIELD OF THE INVENTION

The disclosure is related to improved dielectric ceramics which are stable at high temperatures, are suitable for low frequency charging applications and which have an improved dielectric constant.

BACKGROUND

The increasing acceptance of electric vehicles has placed a burden on the infrastructure associated with the charging of electric vehicles. There is an ever-increasing necessity for rapid charging which typically involves higher power circuits operating at relatively low frequencies such as 50-125 KHz.

Charging stations comprise complex electrical circuits. A critical component of the functionality of the electrical circuits is based on capacitance. With the power, and trend towards lower frequency, conventional capacitors have proven to be a limiting component in the further development of improvements in charging stations specifically and the charging environment in general.

There are two primary classes of dielectric ceramics used in capacitors. One class of dielectric ceramic, referred to in the art as COG, is widely used in high temperature applications due to the very stable thermal coefficient of capacitance (TCC) which is a measure of the change in capacitance as a function of temperature. COG dielectrics have very little change in capacitance with increase in temperature and therefore they are found to be suitable in high temperature applications. Unfortunately, COG dielectrics typically have a very low dielectric constant and they are not suitable for use in low frequency applications.

The other class of dielectric ceramic commonly employed in capacitors, referred to in the art as X7R, exhibit higher dielectric constants but they also have a high TCC and are therefore not suitable for use in applications with high temperatures or variable temperatures. The capacitance of a capacitor comprising TCC dielectric ceramics varies with temperature thereby requiring additional components to mitigate temperature variation. As would be realized, any component capable of controlling temperature requires energy to operate and the incorporation of such a device is contrary to efforts to minimize energy consumption.

Those of skill in the art have therefore been limited in their ability to advance the art of electrical vehicle charging infrastructure due to the lack of a capacitor based on suitable dielectric ceramics. The present invention provides a dielectric, referred to in the art as a U2J or U2K dielectric ceramic, which is stable at temperatures up to 150° C., at low frequencies, such as 50-125 KHz, and with relatively high dielectric constants.

SUMMARY OF THE INVENTION

The present invention is related to an improved U2J or U2K dielectric ceramic which has improved temperature stability, a relative high dielectric constant and which can function at relatively low frequency.

A particular feature of the dielectric ceramic is suitability with advanced technology electrical vehicle charging stations.

These and other advantages, as will be realized, are provided in a dielectric ceramic composition comprising a main component comprising an oxide represented by:

$$U_a X_b Y_c Z_d ((Ca_{1-x-y}Sr_xM_y)_m(Zr_{1-u-v}Ti_uHf_v)O_3)_{1-a-b-c-d}$$

selected from the group consisting of Formula I wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
$0<a<0.06$; $0.0001<b<0.15$; $0<c\leq0.06$; $d=0$; $0\leq x\leq1$; $0\leq y\leq1$; $0\leq u\leq0.8$; $0\leq v\leq0.2$; and $0.98\leq m\leq1.02$;
Formula II wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$; $0.0001<b<0.15$; $c=0$; $0<d<0.06$; $0\leq x\leq1$; $0\leq y\leq1$; $0.03<u\leq1$; $0\leq v\leq0.2$; and $0.98\leq m\leq1.02$;
Formula III wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$; $0.0001<b<0.15$; $c=0$; $0<d<0.02$; $0\leq x\leq1$; $0\leq y\leq1$; $0\leq u\leq1$; $0\leq v\leq0.2$; and $0.98\leq m\leq1.02$;
Formula IV wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
$0<a<0.06$; $0.0001<b<0.15$; $c=0$; $0<d<0.06$; $0\leq x\leq1$; $0\leq y\leq1$; $0\leq u\leq1$; $0\leq v\leq0.2$; and $0.98\leq m\leq1.02$;
Formula V wherein:
M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$; $0.0001<b<0.15$; $c=0$; $0<d<0.06$; $0\leq x\leq 1$; $0\leq y\leq 1$; $0.1<u<0.55$; $0\leq v\leq 0.2$; and $0.98\leq m\leq 1.02$;
Formula VI wherein:
M is at least one alkaline earth selected from the group consisting of Ba and Mg; U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Y, Sc, La, Ce, Pr, Nd, Sm, Eu, Gd, Tb, Dy, Ho, Er, Tm, Yb and Lu;
$0<a<0.06$; $0.0001<b<0.15$; $c=0$; $0.015<d<0.06$; $0\leq x\leq 1$; $0\leq y\leq 1$; $0.1<u<0.55$; $0\leq v\leq 0.2$; $0.98\leq m\leq 1.02$; and
Formula VII wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, Pr, Nd, Sm, Eu, Gd, Tb, Dy, Ho, Er, Tm, Yb and Lu;
$0<a<0.06$; $0.0001<b<0.15$; $0<c\leq 0.06$; $0<d<0.06$; $0\leq x\leq 1$; $0\leq y\leq 1$; $0.1<u<0.8$; $0\leq v\leq 0.2$; and $0.98\leq m\leq 1.02$.

DESCRIPTION

Disclosed is a nonreducible dielectric ceramic composition that is compatible with co-firing internal electrode using base metals, such as Ni and nickel alloys, in reducing atmosphere. The dielectric ceramic composition has a good temperature characteristic of the capacitance in a wide temperature range. Specifically, multilayer ceramic capacitors made by the dielectric ceramic composition can have a temperature coefficient of capacitance within ±1000 ppm/° C. over a temperature range from −55° C. to 150° C.

The present invention provides a multilayer ceramic capacitor device formed by a plurality of laminated ceramic layers and a plurality of internal electrode layers wherein the ceramic layers and internal electrode layers are alternatively stacked. The ceramic layers are made by the disclosed dielectric compositions, and the internal electrodes layers are made by conductive paste mainly containing base metals such as Ni and the like. The obtained multilayer ceramic capacitor can have a temperature coefficient of capacitance within ±1000 ppm/° C. over a temperature range from −55° C. to 150° C. after co-firing at low oxygen partial pressure.

Provided herein is a dielectric ceramic composition which is particularly suitable for use in Class I ceramic capacitors. The dielectric ceramic composition comprises at least a main component containing a compound oxide based on $A_mBO_3$ formula, doped with various subcomponents, wherein A is at least one element selected from the group consisting of Ca, Sr, Ba and Mg; B is at least one element selected from the group consisting of Zr, Ti and Hf; and $0.98\leq m\leq 1.02$. The dielectric ceramic composition can be co-fired with internal electrodes comprising base metals in reducing atmosphere. A multilayer ceramic capacitor comprising the dielectric ceramic composition exhibits a temperature characteristic of capacitance within ±1000 ppm/° C. over a temperature range from −55° C. to 150° C.

The dielectric ceramic is a nonreducible oxide defined by the following formula:

$$U_aX_bY_cZ_d((Ca_{1-x-y}Sr_xM_y)_m(Zr_{1-u-v}Ti_uHf_v)O_3)_{1-a-b-c-d} \qquad \text{GF-1}$$

selected from the group consisting of Formula I, Formula II, Formula III, Formula IV, Formula V, Formula VI and Formula VII.

With reference to GF-1, Formula I is defined by the composition wherein:
M is at least one alkaline earth selected from the group consisting of Ba and Mg;
U comprises a carbonate or oxide of at least one first transition metal selected from the group consisting of Zn, Cu, Ni, Co, Fe, Mn, Cr, and Al; U is preferably Mn;
X comprises at least one sintering aid comprising a compound comprising at least one element selected from the group consisting of Li, B, and Si; X is preferably Si;
Y comprises a carbonate or oxide of at least one second transition metal selected from the group consisting of W, Ta, and Mo; Y is preferably W.
$0<a<0.06$; $0.0001<b<0.15$; $0<c\leq 0.06$; $d=0$; $0\leq x\leq 1$; $0\leq y\leq 1$; $0\leq u<0.8$; $0\leq v\leq 0.2$; and $0.98\leq m\leq 1.02$.

With reference to GF-1, Formula II is defined by the composition wherein:
M is Ba;
U comprises a carbonate or oxide of at least one first transition metal selected from the group consisting of Zn, Cu, Ni, Co, Fe, Mn, and Cr; U is preferably Mn;
X comprises at least one sintering aid comprising a compound comprising at least one element selected from the group consisting of Li, B, and Si; X is preferably Si;
Z comprises at least one rare-earth element selected from the group consisting of Sc, La, Ce, Pr, Nd, Sm, Eu, Gd, Tb, Dy, Ho, Er, Tm, Yb and Lu; Z is preferably selected from the group consisting of Ce, Eu, Gd, Tb and Dy;
$0<a<0.06$; $0.0001<b<0.15$; $c=0$; $0<d<0.06$; $0\leq x\leq 1$; $0\leq y\leq 1$; $0.03<u\leq 1$; $0\leq v\leq 0.2$; and $0.98\leq m\leq 1.02$.

With reference to GF-1, Formula III is defined by the composition wherein:
M is Ba;
U comprises a carbonate or oxide of at least one first transition metal selected from the group consisting of Zn, Cu, Ni, Co, Fe, Mn, and Cr; U is preferably Mn;
X comprises at least one sintering aid comprising a compound comprising at least one element selected from the group consisting of Li, B, and Si; X is preferably Si;
Z comprises at least one rare-earth element selected from the group consisting of Sc, La, Ce, Pr, Nd, Sm, Eu, Gd, Tb, Dy, Ho, Er, Tm, Yb and Lu; Z is preferably selected from the group consisting of Pr, Eu, Gd, Tb and Dy;
0<a<0.06; 0.0001<b<0.15; c=0; 0<d<0.02; 0≤x≤1; 0≤y≤1; 0≤u≤1; 0≤v0.2; and 0.98≤m≤1.02.

With reference to GF-1, Formula IV is defined by the composition wherein:
M is Ba;
U comprises a carbonate or oxide of at least one first transition metal selected from the group consisting of Zn, Cu, Ni, Co, Fe, Mn, and Cr; U is preferably Mn;
X comprises at least one sintering aid comprising a compound comprising at least one element selected from the group consisting of Li, B, and Si; X is preferably Si;
Z comprises at least one rare-earth element selected from the group consisting of Sc, La, Ce, Pr, Nd, Sm, Eu, Gd, Tb, Ho, Er, Tm, Yb and Lu; Z is preferably selected from the group consisting of Nd, Eu, Gd and Tb;
0<a<0.06; 0.0001<b<0.15; c=0; 0<d<0.06; 0≤x≤1; 0≤y≤1; 0≤u≤1; 0≤v≤0.2; and 0.98≤m≤1.02.

With reference to GF-1, Formula V is defined by the composition wherein:
M is at least one alkaline earth selected from the group consisting of Ba and Mg;
U comprises a carbonate or oxide of at least one first transition metal selected from the group consisting of Zn, Cu, Ni, Co, Fe, Mn, Cr, and Al; U is preferably Mn;
X comprises at least one sintering aid comprising a compound comprising at least one element selected from the group consisting of Li, B, and Si; X is preferably Si;
Z comprises at least one rare-earth element selected from the group consisting of Sc, La, Ce, Pr, Nd, Sm, Eu, Gd, Tb, Dy, Ho, Er, Tm, Yb and Lu; is preferably selected from the group consisting of Eu, Gd, Tb and Dy;
0<a<0.06; 0.0001<b<0.15; c=0; 0<d<0.06; 0≤x≤1; 0≤y≤1; 0.1<u<0.55; 0≤v≤0.2; and 0.981.02.

With reference to GF-1, Formula VI is defined by the composition wherein:
M is at least one alkaline earth selected from the group consisting of Ba and Mg;
U comprises a carbonate or oxide of at least one first transition metal selected from the group consisting of Zn, Cu, Ni, Co, Fe, Mn, Cr, and Al; U is preferably Mn;
X comprises at least one sintering aid comprising a compound comprising at least one element selected from the group consisting of Li, B, and Si; X is preferably Si;
Z comprises at least one rare-earth element selected from the group consisting of Y, Sc, La, Ce, Pr, Nd, Sm, Eu, Gd, Tb, Dy, Ho, Er, Tm, Yb and Lu; Z is preferably selected from the group consisting of Y, Eu, Gd, Tb and Dy;
0<a<0.06; 0.0001<b<0.15; c=0; 0.015<d<0.06; 0≤x≤1; 0≤y≤1; 0.1<u<0.55; 0≤v≤0.2; and 0.98≤m≤1.02.

With reference to GF-1, Formula VII is defined by the composition wherein:
M is at least one alkaline earth selected from the group consisting of Ba and Mg;
U comprises a carbonate or oxide of at least one first transition metal selected from the group consisting of Zn, Cu, Ni, Co, Fe, Mn, Cr, and Al; U is preferably Mn;
X comprises at least one sintering aid comprising a compound comprising at least one element selected from the group consisting of Li, B, and Si; X is preferably Si;
Y comprises a carbonate or oxide of at least one second transition metal selected from the group consisting of W, Ta, and Mo; Y is preferably W;
Z comprises at least one rare-earth element selected from the group consisting of Y, Sc, Pr, Nd, Sm, Eu, Gd, Tb, Dy, Ho, Er, Tm, Yb and Lu; Z is preferably Y;
0<a<0.06; 0.0001<b<0.15; 0<c≤0.06; 0<d<0.06; 0≤x≤1; 0≤y≤1; 0.1<u<0.8; 0≤v≤0.2; and 0.98≤m≤1.02.

The invention will be described with reference to the figure which is an integral, but non-limiting, part of the specification provided for clarity of the invention.

Figure 1:
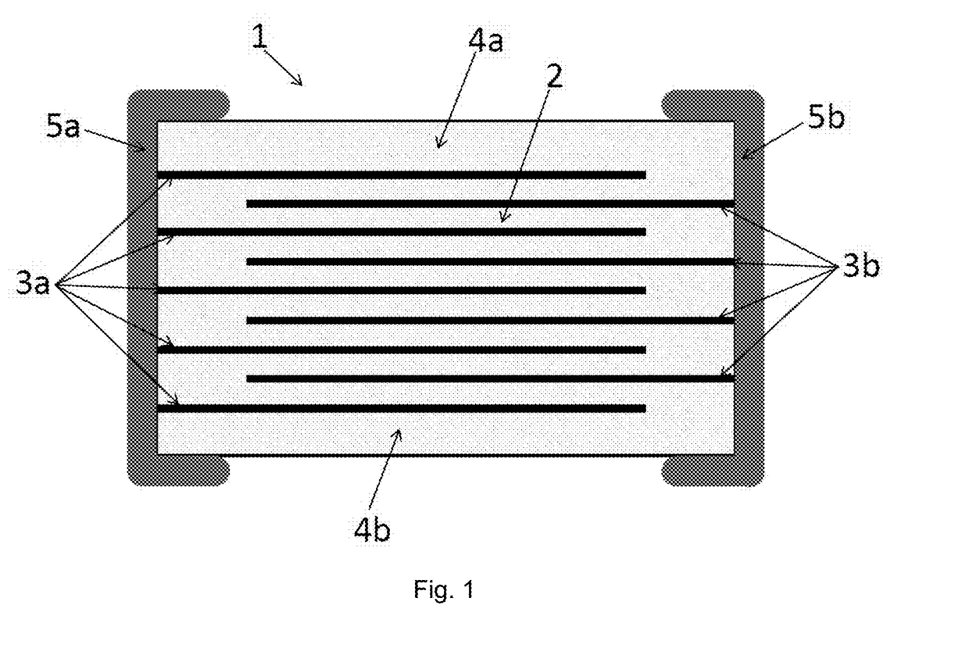
FIG. 1 is a schematic cross-sectional view of an embodiment of the invention.

An embodiment of the invention will be described with reference to FIG. 1 wherein a multilayered ceramic capacitor (MLCC) is illustrated in schematic cross-sectional view. In FIG. 1 the MLCC, 1, comprises internal electrodes, 3, in electrical contact with external terminations, 5. First internal electrodes, 3a, are in electrical contact with a first external termination, 5a and second internal electrodes, 3b, and are in electrical contact with a second external termination, 5b. Each set of internal electrodes provides a capacitive couple as known to those of skill in the art. The internal electrodes are separated by an internal dielectric ceramic, 2, of the instant invention with an upper dielectric ceramic, 4a, and lower dielectric ceramic, 4b, outside of the capacitive couples. The internal dielectric, upper dielectric ceramic and lower dielectric ceramic may be the same or different. In a preferred embodiment the internal dielectric ceramic, upper dielectric ceramic and lower dielectric ceramic are the same with a preference for a dielectric ceramic of the instant invention. In a preferred embodiment the internal electrodes comprise a base metal, such as nickel, and the capacitor is fired in a reducing atmosphere. Nickel or nickel alloy is particularly preferred as a base metal.

Figure 2:
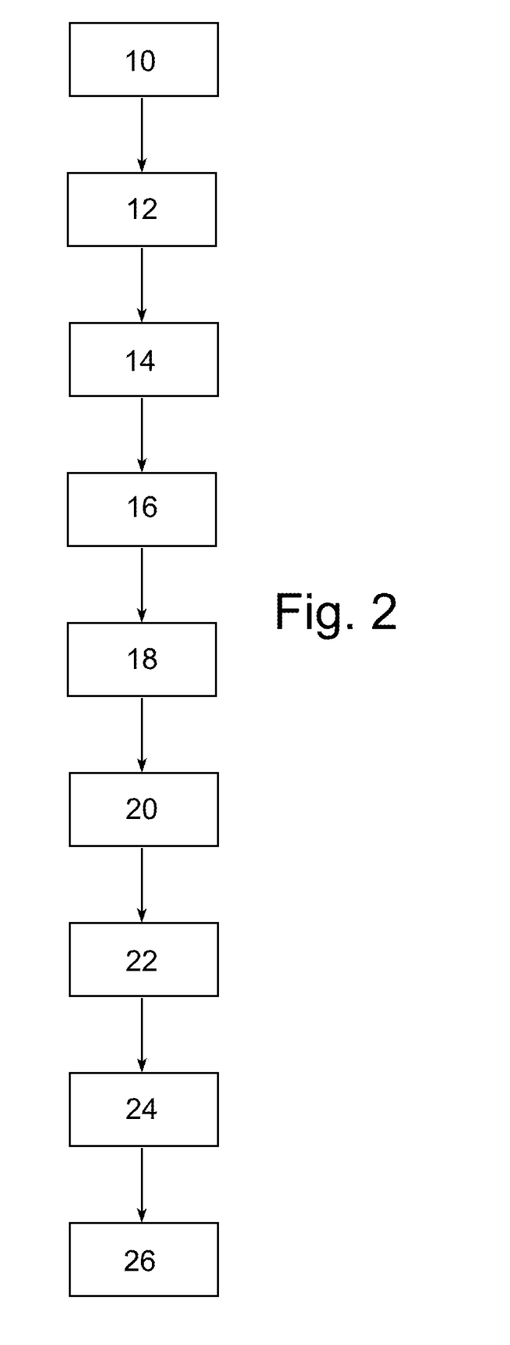
FIG. 2 is a flow chart illustrating an embodiment of the invention.

A process for forming a MLCC will be described with reference to FIG. 2 wherein the process is illustrated by a flow chart representation. With reference to FIG. 2, a dielectric ceramic is formed at 10, preferably by solid state synthetic methods which are well known in the art. A ceramic slip is formed at 12 wherein the ceramic slip comprises the dielectric ceramic. The ceramic slip is a formable material. The ceramic slip typically comprises organic carriers and the like to allow for coating of the ceramic slip onto a substrate. A coating is formed, 14, of the ceramic slip onto a substrate. The substrate is not particularly limiting since it does not become part of the finished product. Polyethylene terephthalate (PET) is widely used in the art due to, among other things, cost and availability, and is suitable for demonstration of the invention. The method of forming the coating is not particularly limited with the exception of preference for those methods suitable for forming a coating of consistent thickness. Doctor blade methods are widely used and suitable for demonstration of the invention. The ceramic slip is dried at 16. The internal electrodes are formed by printing electrode patterns of conductive ink onto the dried ceramic slip at 18. The conductive ink preferably comprises a base metal with nickel or nickel alloy being preferred. A stack is formed at 20 wherein the stack comprises ceramic precursor layers, without printing, to form the dielectric ceramic layer which is external to the capacitive couple. Layers comprising the printed electrode pattern are then layered sequentially with adjacent layers are offset such that alternate printed electrode patterns are in registration. Additional layers which do not have printing are applied to form the opposite dielectric ceramic which is external to the capacitive couple. The layered structure is pressed and heated to form a laminate at 22. The laminate is diced to form green chips at 24. The green chips are sintered and terminated as known in the art to form a capacitor at 26.

The conductor which forms the internal electrode layers is preferably a base metal. Typical base metals are nickel and nickel alloys. Preferred nickel alloys are alloys of nickel with at least one member selected from Mn, Cr, Co, and Al, with such nickel alloys containing at least 95 wt % of nickel being more preferred. The nickel and nickel alloys may contain up to about 0.1 wt % of phosphorous and other trace components. Other conductors which may be employed as internal electrodes such as copper, precious metal or alloys thereof with particularly preferred precious metals selected from palladium and silver. It would be understood that with copper or precious metal containing internal electrodes lower temperature firing is preferred.

EXAMPLES

A series of ceramic compositions were prepared in accordance with standard synthetic procedures as well known in the art. In general, metal salts were mixed in the stoichiometric ratio of the intended dielectric ceramic and the mixture was heated to form the dielectric ceramic.

Example 1

An example corresponding to Formula I was prepared by mixing a base oxide of $(Ca_{0.7}Sr_{0.3})(Zr_{0.6}Ti_{0.4})O_3$ with $MnCO_3$, $SiO_2$, and $WO_3$ wherein the mole fraction of $MnCO_3$, $SiO_2$, and $WO_3$ relative to one mole of the base oxide is shown in Table 1.

TABLE 1

| Sample no. | first subcomponent type | mol % | second subcomponent type | mol % | third subcomponent type | mol % |
|---|---|---|---|---|---|---|
| 1 | Mn | 2 | SiO$_2$ | 0.55 | W | 0.2 |
| 2 | Mn | 2 | SiO$_2$ | 0.55 | W | 0.4 |

Example 2

An example corresponding to Formula II was prepared by mixing a base oxide of $(Ca_{0.7}Sr_{0.3})(Zr_{0.6}Ti_{0.4})O_3$ with $MnCO_3$, $SiO_2$, $CeO_2$, $EuO_{3/2}$, $GdO_{3/2}$, $TbO_{7/4}$, and $DyO_{3/2}$, wherein the mole fraction of $MnCO_3$, $SiO_2$, $CeO_2$, $EuO_{3/2}$, $GdO_{3/2}$, $TbO_{7/4}$, and $DyO_{3/2}$ relative to one mole of the base oxide is shown in Table 2.

TABLE 2

| Sample no. | first subcomponent type | mol % | second subcomponent type | mol % | third subcomponent type | mol % |
|---|---|---|---|---|---|---|
| 3 | Mn | 2 | SiO$_2$ | 0.55 | Ce | 1 |
| 4 | Mn | 1.5 | SiO$_2$ | 0.55 | Eu | 2 |
| 5 | Mn | 2 | SiO$_2$ | 0.55 | Gd | 1.5 |
| 6 | Mn | 2 | SiO$_2$ | 0.55 | Tb | 1.25 |
| 7 | Mn | 2 | SiO$_2$ | 0.55 | Dy | 2 |

Example 3

An example corresponding to Formula III was prepared by mixing a base oxide of $(Ca_{0.7}Sr_{0.3})(Zr_{0.6}Ti_{0.4})O_3$ with $MnCO_3$, $SiO_2$, $PrO_{11/6}$, $EuO_{3/2}$, $GdO_{3/2}$, $TbO_{7/4}$, and $DyO_{3/2}$, wherein the mole fraction of $MnCO_3$, $SiO_2$, $PrO_{11/6}$, $EuO_{3/2}$, $GdO_{3/2}$, $TbO_{7/4}$, and $DyO_{3/2}$ is shown in Table 3.

TABLE 3

| Sample no. | first subcomponent type | mol % | second subcomponent type | mol % | third subcomponent type | mol % |
|---|---|---|---|---|---|---|
| 8 | Mn | 2 | SiO$_2$ | 0.55 | Pr | 1 |
| 9 | Mn | 1.5 | SiO$_2$ | 0.55 | Eu | 1.5 |
| 10 | Mn | 1.5 | SiO$_2$ | 0.55 | Gd | 1 |
| 11 | Mn | 2 | SiO$_2$ | 0.55 | Tb | 1.5 |
| 12 | Mn | 2 | SiO$_2$ | 0.55 | Dy | 1 |

Example 4

An example corresponding to Formula IV was prepared by mixing a base oxide of $(Ca_{0.7}Sr_{0.3})(Zr_{0.6}Ti_{0.4})O_3$ with $MnCO_3$, $SiO_2$, $NdO_{3/2}$, $EuO_{3/2}$, $GdO_{3/2}$, and $TbO_{7/4}$, wherein the mole fraction of $MnCO_3$, $SiO_2$, $NdO_{3/2}$, $EuO_{3/2}$, $GdO_{3/2}$, and $TbO_{7/4}$ is shown in Table 4.

TABLE 4

| Sample no. | first subcomponent type | mol % | second subcomponent type | mol % | third subcomponent type | mol % |
|---|---|---|---|---|---|---|
| 13 | Mn | 2 | SiO$_2$ | 0.55 | Nd | 1 |
| 14 | Mn | 2 | SiO$_2$ | 0.55 | Eu | 2 |
| 15 | Mn | 2 | SiO$_2$ | 0.55 | Gd | 1 |
| 16 | Mn | 1.75 | SiO$_2$ | 0.55 | Tb | 1.5 |

Example 5

An example corresponding to Formula V was prepared by mixing a base oxide of $(Ca_{0.7}Sr_{0.3})(Zr_{0.6}Ti_{0.4})O_3$ with $MnCO_3$, $SiO_2$, $EuO_{3/2}$, $GdO_{3/2}$, $TbO_{7/4}$, and $DyO_{3/2}$, wherein the mole fraction of $MnCO_3$, $SiO_2$, $EuO_{3/2}$, $GdO_{3/2}$, $TbO_{7/4}$, and $DyO_{3/2}$ is shown in Table 5.

TABLE 5

| Sample no. | first subcomponent type | mol % | second subcomponent type | mol % | third subcomponent type | mol % |
|---|---|---|---|---|---|---|
| 17 | Mn | 2 | SiO$_2$ | 0.55 | Eu | 1 |
| 18 | Mn | 1.25 | SiO$_2$ | 0.55 | Gd | 1 |
| 19 | Mn | 2.25 | SiO$_2$ | 0.55 | Tb | 1.5 |
| 20 | Mn | 1.5 | SiO$_2$ | 0.55 | Dy | 1.5 |

Example 6

An example corresponding to Formula VI was prepared by mixing a base oxide of $(Ca_{0.7}Sr_{0.3})(Zr_{0.6}Ti_{0.4})O_3$ with $MnCO_3$, $SiO_2$, $YO_{3/2}$, $EuO_{3/2}$, $GdO_{3/2}$, $TbO_{7/4}$, and $DyO_{3/2}$, wherein the mole fraction of $MnCO_3$, $SiO_2$, $YO_{3/2}$, $EuO_{3/2}$, $GdO_{3/2}$, $TbO_{7/4}$, and $DyO_{3/2}$ is shown in Table 6.

TABLE 6

| Sample no. | first subcomponent type | mol % | second subcomponent type | mol % | third subcomponent type | mol % |
|---|---|---|---|---|---|---|
| 21 | Mn | 2 | SiO$_2$ | 0.55 | Y + Eu | 2.5 |
| 22 | Mn | 2.5 | SiO$_2$ | 0.55 | Eu | 2 |
| 23 | Mn | 2 | SiO$_2$ | 0.55 | Gd | 2 |

TABLE 6-continued

| Sample no. | first subcomponent type | mol % | second subcomponent type | mol % | third subcomponent type | mol % |
|---|---|---|---|---|---|---|
| 24 | Mn | 2 | $SiO_2$ | 0.55 | Tb | 1.75 |
| 25 | Mn | 2.5 | $SiO_2$ | 0.55 | Dy | 2 |

Example 7

An example corresponding to Formula VII was prepared by mixing a base oxide of $(Ca_{0.7}Sr_{0.3})(Zr_{0.6}Ti_{0.4})O_3$ with $MnCO_3$, $SiO_2$, $WO_3$, and $YO_{3/2}$, wherein the mole fraction of $MnCO_3$, $SiO_2$, $WO_3$, and $YO_{3/2}$ is shown in Table 7.

TABLE 7

| Sample no. | first subcomponent type | mol % | second subcomponent type | mol % | third subcomponent type | mol % | forth subcomponent type | mol % |
|---|---|---|---|---|---|---|---|---|
| 26 | Mn | 2 | $SiO_2$ | 0.55 | Y | 1.5 | W | 0.1 |
| 27 | Mn | 2 | $SiO_2$ | 0.55 | Y | 1.5 | W | 0.2 |

Procedure for Making MLCC

The dielectric ceramic powder was wet milled with the addition of suitable organic additives to form a ceramic slip. A ceramic green sheet was formed using a tape-casting process by spreading the ceramic slip onto a polyethylene terephthalate (PET) carrier film using a doctor blade method. After drying, internal electrodes were screen printed onto the ceramic green sheet using a conductive ink comprising base metals. For demonstration of the invention nickel was used as the base metal. A green chip was formed via a stacking process as known in the art.

A plurality of ceramic green sheets without printed electrode were stacked as bottom cover layers. A plurality of ceramic green sheets, with printed electrodes, were laminated in alternate directions to form alternating electrodes that terminate at opposite ends. Ceramic green sheets without printed electrode were stacked as top cover layers. The laminated body was then pressed at between 20° C. and 120° C. to improve adhesion of all stacked layers.

Individual green chips were isolated by cutting or dicing after laminating. The green chips were heated at 200° C. to 700° C. in atmospheric air, or slightly reducing atmosphere, for 0.1 to 100 hours to burn off the binders followed by sintering at a temperature between 1100° C. to 1400° C. in a reducing atmosphere with an oxygen partial pressure between $10^{-16}$ atm to $10^{-4}$ atm.

After sintering a reoxidation step may be applied to the chips by heating to a temperature of no more than 1100° C. at an oxygen partial pressure between $10^{-14}$ atm to $10^{-3}$ atm. Thereby, a sintered chip is achieved with a standard 3.2 mm×1.6 mm size.

The sintered chip was subjected to a corner rounding process by barrel or sand blasting to expose internal electrodes formed at both ends of the ceramic sintered body. Subsequently external electrodes were formed at both ends wherein copper terminations were formed by applying suitable copper paste at both ends of the sintered chip followed by baking at a temperature between 600° C. to 1000° C. in nitrogen or slightly reducing atmosphere for 1 minutes to 60 minutes.

After the copper terminations were formed a nickel-plated layer and a tin-plated layer, or other suitable solder composition, were plated on the copper terminations via the barrel plating method to enhance solderability and to prevent oxidation of the copper external electrodes. The result was a multilayer ceramic capacitor formed with base metal electrodes and dielectric ceramic layers comprising the inventive dielectric ceramic composition.

Electrical Measurements

Electrostatic capacitance and dielectric loss were measured under conditions of 1 kHz and AC 1V at a temperature range of −55° C. to 150° C. on six samples for each composition. The temperature coefficient of capacitance (TCC) was calculated based on the following equation:

$$TCC(ppm/°C.)=[(C_T-C_{25})/C_{25}]\times[1/(T-25)]\times10^6$$

wherein T is temperature at which the measurement was conducted, $C_T$ and $C_{25}$ are the electrostatic capacitances at temperature T and 25° C., respectively.

Breakdown voltage (UVBD) was measured at 25° C. on ten samples for each composition.

Insulation resistance (IR) was measured after 60 seconds charging under 50V DC voltage at a temperature range of −55° C. to 150° C. on six samples for each composition. For the insulation resistance measured at 25° C., a value between 1 to 100 GOhms is granted by a rating of "fair", between 100 to 200 GOhms for "good", and large than 200 GOhms for "excellent". For the insulation resistance measured at 125° C., a value between 0.1 to 1 GOhms is granted by a rating of "fair", between 1 to 2 GOhms for "good", and large than 2 GOhms for "excellent". For the insulation resistance measured at 150° C., a value between 10 to 200 MOhms is granted by a rating of "fair", between 200 to 300 MOhms for "good", and large than 300 MOhms for "excellent".

The Highly Accelerated Life Time (HALT) of each sample of the capacitors was measured by holding the capacitor at 140° C. while applying a DC voltage of 400 V. The HALT was characterized by measuring the median time to failure (MTTF) for 20 capacitors of each sample. A value of MTTF less than 40 h is granted by the circle mark "○", between 40 h and 80 h by the diamond mark "◇", and more than 80 h by the square mark "□".

The dielectric constant, loss (%), UVBD (V) and Insulation Resistance are reported in Table 8. Temperature coefficient of capacitance change and HALT results are reported in Table 9.

TABLE 8

| Sample no. | Dielectric constant | Loss % | UVBD V | IR 25° C. | IR 125° C. | IR 150° C. |
|---|---|---|---|---|---|---|
| 1 | 71.0 | 0.020 | 667 | excellent | excellent | excellent |
| 2 | 70.5 | 0.020 | 655 | excellent | fair | fair |
| 3 | 71.6 | 0.014 | 652 | good | good | excellent |
| 4 | 71.6 | 0.013 | 692 | excellent | fair | fair |
| 5 | 73.3 | 0.013 | 647 | good | excellent | excellent |
| 6 | 70.0 | 0.010 | 660 | excellent | excellent | excellent |
| 7 | 69.8 | 0.016 | 644 | fair | good | fair |
| 8 | 71.5 | 0.016 | 664 | excellent | excellent | excellent |
| 9 | 70.6 | 0.010 | 687 | excellent | fair | fair |
| 10 | 76.7 | 0.015 | 659 | excellent | fair | fair |
| 11 | 69.0 | 0.015 | 674 | good | excellent | excellent |
| 12 | 68.6 | 0.023 | 679 | excellent | excellent | excellent |
| 13 | 72.8 | 0.016 | 661 | excellent | good | excellent |
| 14 | 69.3 | 0.016 | 652 | fair | fair | fair |
| 15 | 72.0 | 0.013 | 636 | excellent | excellent | excellent |
| 16 | 70.0 | 0.014 | 672 | excellent | good | good |
| 17 | 73.1 | 0.011 | 658 | excellent | excellent | excellent |

TABLE 8-continued

| Sample no. | Dielectric constant | Loss % | UVBD V | IR 25° C. | IR 125° C. | IR 150° C. |
|---|---|---|---|---|---|---|
| 18 | 78.4 | 0.019 | 662 | excellent | fair | fair |
| 19 | 69.3 | 0.014 | 658 | good | excellent | excellent |
| 20 | 68.8 | 0.013 | 682 | excellent | fair | fair |
| 21 | 68.8 | 0.024 | 672 | fair | fair | fair |
| 22 | 71.0 | 0.023 | 659 | fair | fair | fair |
| 23 | 73.2 | 0.016 | 639 | fair | fair | fair |
| 24 | 68.4 | 0.012 | 650 | good | good | good |
| 25 | 69.3 | 0.0175 | 658 | fair | fair | fair |
| 26 | 72.3 | 0.020 | 654 | good | fair | fair |
| 27 | 68.4 | 0.015 | 678 | good | fair | fair |

TABLE 9

| Sample no. | TCC, ppm/° C. −55° C. | 85° C. | 125° C. | 150° C. | MTTF |
|---|---|---|---|---|---|
| 1 | 962 | −798 | −755 | −728 | ○ |
| 2 | 911 | −758 | −718 | −693 | ○ |
| 3 | 887 | −741 | −703 | −680 | ○ |
| 4 | 790 | −668 | −633 | −611 | ◇ |
| 5 | 839 | −704 | −667 | −644 | □ |
| 6 | 850 | −712 | −675 | −652 | □ |
| 7 | 766 | −652 | −616 | −597 | ◇ |
| 8 | 887 | −744 | −706 | −682 | ◇ |
| 9 | 828 | −701 | −665 | −643 | ◇ |
| 10 | 921 | −768 | −727 | −702 | ○ |
| 11 | 816 | −685 | −651 | −629 | □ |
| 12 | 886 | −740 | −701 | −676 | ○ |
| 13 | 880 | −759 | −712 | −686 | ○ |
| 14 | 776 | −663 | −627 | −605 | □ |
| 15 | 897 | −749 | −710 | −685 | ○ |
| 16 | 822 | −691 | −655 | −633 | ◇ |
| 17 | 890 | −744 | −704 | −680 | ○ |
| 18 | 919 | −765 | −724 | −699 | ○ |
| 19 | 814 | −684 | −649 | −627 | □ |
| 20 | 827 | −697 | −662 | −640 | ◇ |
| 21 | 739 | −626 | −595 | −575 | ○ |
| 22 | 789 | −663 | −629 | −608 | □ |
| 23 | 789 | −664 | −629 | −607 | ◇ |
| 24 | 791 | −665 | −632 | −611 | □ |
| 25 | 771 | −651 | −616 | −594 | ◇ |
| 26 | 812 | −676 | −640 | −622 | ○ |
| 27 | 782 | −660 | −627 | −606 | ○ |

The invention has been described with reference to preferred embodiments without limit thereto. One of skill in the art would realize additional embodiments which are described and set forth in the claims appended hereto.

The invention claimed is:

1. A dielectric ceramic composition comprising:
a main component comprising an oxide represented by:

$U_a X_b Y_c Z_d ((Ca_{1-x-y} Sr_x M_y)_m (Zr_{1-u-v} Ti_u Hf_v) O_3)_{1-a-b-c-d}$ selected from the group consisting of Formula I wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
$0<a<0.06$;
$0.0001<b<0.15$;
$0<c≤0.06$;
$d=0$;
$0≤x≤1$;
$0≤y≤1$;
$0≤u<0.8$;
$0≤v≤0.2$; and
$0.98≤m≤1.02$;
Formula II wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.06$;
$0≤x≤1$;
$0≤y≤1$;
$0.03<u≤1$;
$0≤v≤0.2$; and
$0.98≤m≤1.02$;
Formula III wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.02$;
$0≤x≤1$;
$0≤y≤1$;
$0≤u≤1$;
$0≤v≤0.2$; and
$0.98≤m≤1.02$;
Formula IV wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
$0<a<0.06$;
$0.0001<b<0.15$;
$c=0$;
$0<d<0.06$;
$0≤x≤1$;
$0≤y≤1$;
$0≤v≤0.2$; and
$0.98≤m≤1.02$;

Formula V wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Z comprises at least one rare-earth element selected from the group consisting of Sc, La, Ce, Pr, Nd, Sm, Eu, Gd, Tb, Dy, Ho, Er, Tm, Yb and Lu;

$0<a<0.06$;
$0.0001<b<0.15$;
$c=0$;
$0<d<0.06$;
$0\leq x\leq 1$;
$0\leq y\leq 1$;
$0.1<u<0.55$;
$0\leq v\leq 0.2$; and
$0.98\leq m\leq 1.02$;

Formula VI wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Z comprises at least one rare-earth element selected from the group consisting of Y, Sc, La, Ce, Pr, Nd, Sm, Eu, Gd, Tb, Dy, Ho, Er, Tm, Yb and Lu;

$0<a<0.06$;
$0.0001<b<0.15$;
$c=0$;
$0.015<d<0.06$;
$0\leq x\leq 1$;
$0\leq y\leq 1$;
$0.1<u<0.55$;
$0\leq v\leq 0.2$; and
$0.98\leq m\leq 1.02$; and Formula VII wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Y comprises a carbonate or oxide of at least one second transition metal selected from the group consisting of W, Ta, and Mo;

Z comprises at least one rare-earth element selected from the group consisting of Y, Sc, Pr, Nd, Sm, Eu, Gd, Tb, Dy, Ho, Er, Tm, Yb and Lu;

$0<a<0.06$;
$0.0001<b<0.15$;
$0<c\leq 0.06$;
$0<d<0.06$;
$0\leq x\leq 1$;
$0\leq y\leq 1$;
$0.1<u<0.8$;
$0\leq v\leq 0.2$; and
$0.98\leq m\leq 1.02$.

2. The dielectric ceramic composition of claim 1 having a temperature characteristic of capacitance within ±1000 ppm/° C. over a temperature range from −55° C. to 150° C.

3. A dielectric ceramic composition comprising:

wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Y comprises a carbonate or oxide of at least one second transition metal selected from the group consisting of W, Ta, and Mo;

$0<a<0.06$;
$0.0001<b<0.15$;
$0<c\leq 0.06$;
$d=0$;
$0\leq x\leq 1$;
$0\leq y\leq 1$;
$0\leq u<0.8$;
$0\leq v\leq 0.2$; and
$0.98\leq m\leq 1.02$.

4. The dielectric ceramic composition of claim 3 having a temperature characteristic of capacitance within ±1000 ppm/° C. over a temperature range from −55° C. to 150° C.

5. The dielectric ceramic composition of claim 3 wherein U is Mn.

6. The dielectric ceramic composition of claim 3 wherein X is Si.

7. The dielectric ceramic composition of claim 3 wherein Y is W.

8. A dielectric ceramic composition comprising:

wherein:

M is Ba;

U comprising a carbonate or oxide of at least one first transition metal selected from the group consisting of Zn, Cu, Ni, Co, Fe, Mn, and Cr;

X comprises at least one sintering aid comprising a compound comprising at least one element selected from the group consisting of Li, B, and Si;

Z comprises at least one rare-earth element selected from the group consisting of Sc, La, Ce, Pr, Nd, Sm, Eu, Gd, Tb, Dy, Ho, Er, Tm, Yb and Lu;

$0<a<0.06$;
$0.0001<b<0.15$;
$c=0$;
$0<d<0.06$;
$0\leq x\leq 1$;
$0\leq y\leq 1$;
$0.03<u\leq 1$;
$0\leq v\leq 0.2$; and
$0.98\leq m\leq 1.02$.

9. The dielectric ceramic composition of claim 8 having a temperature characteristic of capacitance within ±1000 ppm/° C. over a temperature range from −55° C. to 150° C.

10. The dielectric ceramic composition of claim 8 wherein U is Mn.

11. The dielectric ceramic composition of claim 8 wherein X is Si.

12. The dielectric ceramic composition of claim 8 wherein Z is selected from the group consisting of Ce, Eu, Gd, Tb, and Dy.

13. A dielectric ceramic composition comprising:

wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.02$;
$0\leq x\leq 1$;
$0\leq y\leq 1$;
$0\leq u\leq 1$;
$0\leq v\leq 0.2$; and
$0.98\leq m\leq 1.02$.

14. The dielectric ceramic composition of claim 13 having a temperature characteristic of capacitance within ±1000 ppm/° C. over a temperature range from −55° C. to 150° C.

15. The dielectric ceramic composition of claim 13 wherein U is Mn.

16. The dielectric ceramic composition of claim 13 wherein X is Si.

17. The dielectric ceramic composition of claim 13 wherein Z is selected from the group consisting of Pr, Eu, Gd, Tb and Dy.

18. A dielectric ceramic composition comprising:

wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
$0<a<0.06$;
$0.0001<b<0.15$;
$c=0$;
$0<d<0.06$;
$0\leq x\leq 1$;
$0\leq y\leq 1$;
$0\leq u\leq 1$;
$0\leq v\leq 0.2$; and
$0.98\leq m\leq 1.02$.

19. The dielectric ceramic composition of claim 18 having a temperature characteristic of capacitance within ±1000 ppm/° C. over a temperature range from −55° C. to 150° C.

20. The dielectric ceramic composition of claim 18 wherein U is Mn.

21. The dielectric ceramic composition of claim 18 wherein X is Si.

22. The dielectric ceramic composition of claim 18 wherein Z is selected from the group consisting of Nd, Eu, Gd and Tb.

23. A dielectric ceramic composition comprising:

wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.06$;
$0\leq x\leq 1$;
$0\leq y\leq 1$;
$0.1<u<0.55$;
$0\leq v\leq 0.2$; and
$0.98\leq m\leq 1.02$.

24. The dielectric ceramic composition of claim 23 having a temperature characteristic of capacitance within ±1000 ppm/° C. over a temperature range from −55° C. to 150° C.

25. The dielectric ceramic composition of claim 23 wherein M is Ba.

26. The dielectric ceramic composition of claim 23 wherein U is Mn.

27. The dielectric ceramic composition of claim 23 wherein X is Si.

28. The dielectric ceramic composition of claim 23 wherein Z is selected from the group consisting of Eu, Gd, Tb and Dy.

29. A dielectric ceramic composition comprising:

wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Y, Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0.015<d<0.06$;
$0\leq x\leq 1$;
$0\leq y\leq 1$;
$0.1<u<0.55$;
$0\leq v\leq 0.2$; and
$0.98\leq m\leq 1.02$.

30. The dielectric ceramic composition of claim 29 having a temperature characteristic of capacitance within ±1000 ppm/° C. over a temperature range from −55° C. to 150° C.

31. The dielectric ceramic composition of claim 29 wherein M is Ba.

32. The dielectric ceramic composition of claim 29 wherein U is Mn.

33. The dielectric ceramic composition of claim 29 wherein X is Si.

34. The dielectric ceramic composition of claim 29 wherein Z is selected from the group consisting of Y, Eu, Gd, Tb and Dy.

35. A dielectric ceramic composition comprising:

$$U_aX_bY_cZ_d((Ca_{1-x-y}Sr_xM_y)_m(Zr_{1-u-v}Ti_uHf_v)O_3)_{1-a-b-c-d}$$

wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, Pr, Nd, Sm, Eu, Gd, Tb, Dy, Ho, Er, Tm, Yb and Lu;
$0<a<0.06$;
$0.0001<b<0.15$;
$0<c\leq 0.06$;
$0<d<0.06$;
$0\leq x\leq 1$;
$0\leq y\leq 1$;
$0.1<u<0.8$;
$0\leq v\leq 0.2$; and
$0.98\leq m\leq 1.02$.

36. The dielectric ceramic composition of claim 35 having a temperature characteristic of capacitance within ±1000 ppm/° C. over a temperature range from −55° C. to 150° C.

37. The dielectric ceramic composition of claim 35 wherein M is Ba.

38. The dielectric ceramic composition of claim 35 wherein U is Mn.

39. The dielectric ceramic composition of claim 35 wherein X is Si.

40. The dielectric ceramic composition of claim 35 wherein Y is W.

41. The dielectric ceramic composition of claim 35 wherein Z is Y.

42. A multilayered ceramic capacitor comprising:
first internal electrodes and second internal electrodes in an alternating stack with a dielectric ceramic between adjacent internal electrodes wherein said first internal electrodes terminate at a first external termination and said second internal electrodes terminate at a second external termination and wherein said dielectric ceramic comprises an oxide represented by:

$$U_aX_bY_cZ_d((Ca_{1-x-y}Sr_xM'_y)_m(Zr_{1-u-v}Ti_uHf_v)O_3)_{1-a-b-c-d}$$

selected from the group consisting of Formula I wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
$0<a<0.06$;
$0.0001<b<0.15$;
$0<c\leq 0.06$;
$d=0$;
$0\leq x\leq 1$;
$0\leq y\leq 1$;
$0\leq u<0.8$;
$0\leq v\leq 0.2$; and
$0.98\leq m\leq 1.02$;
Formula II wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.06$;
$0\leq x\leq 1$;
$0\leq y\leq 1$;
$0.03<u\leq 1$;
$0\leq v\leq 0.2$; and
$0.98\leq m\leq 1.02$;
Formula III wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.02$;
$0\leq x\leq 1$;
$0\leq y\leq 1$;
$0\leq u\leq 1$;
$0\leq v\leq 0.2$; and
$0.98\leq m\leq 1.02$;
Formula IV wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
$0<a<0.06$;
$0.0001<b<0.15$;
$c=0$;
$0<d<0.06$;
$0\leq x\leq 1$;
$0\leq y\leq 1$;
$0\leq u\leq 1$;
$0\leq v\leq 0.2$; and
$0.98\leq m\leq 1.02$;

Formula V wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.06$;
$0 \le x \le 1$;
$0 \le y \le 1$;
$0.1<u<0.55$;
$0 \le v \le 0.2$; and
$0.98 \le m \le 1.02$;
Formula VI wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Y, Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0.015<d<0.06$;
$0 \le x \le 1$;
$0 \le y \le 1$;
$0.1<u<0.55$;
$0 \le v \le 0.2$; and
$0.98 \le m \le 1.02$; and
Formula VII wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, Pr, Nd, Sm, Eu, Gd, Tb, Dy, Ho, Er, Tm, Yb and Lu;
$0<a<0.06$;
$0.0001<b<0.15$;
$0<c \le 0.06$;
$0<d<0.06$;
$0 \le x \le 1$;
$0 \le y \le 1$;
$0.1<u<0.8$;
$0 \le v \le 0.2$; and
$0.98 \le m \le 1.02$.

43. The multilayered ceramic capacitor of claim 42 having a temperature characteristic of capacitance within ±1000 ppm/° C. over a temperature range from −55° C. to 150° C.

44. A method of forming a multilayered ceramic capacitor comprising:
forming a dielectric ceramic comprising an oxide represented by:

selected from the group consisting of Formula I wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
$0<a<0.06$;
$0.0001<b<0.15$;
$0<c \le 0.06$;
$d=0$;
$0 \le x \le 1$;
$0 \le y \le 1$;
$0 \le u<0.8$;
$0 \le v \le 0.2$; and
$0.98 \le m \le 1.02$;
Formula II wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.06$;
$0 \le x \le 1$;
$0 \le y \le 1$;
$0.03<u \le 1$;
$0 \le v \le 0.2$; and
$0.98 \le m \le 1.02$;
Formula III wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$;
$0.0001<b<0.15$;
$c=0$;
$0<d<0.02$;
$0 \le x \le 1$;
$0 \le y \le 1$;

$0 \leq u \leq 1$;
$0 \leq v \leq 0.2$; and
$0.98 \leq m \leq 1.02$;
Formula IV wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
$0 < a < 0.06$;
$0.0001 < b < 0.15$;
$c = 0$;
$0 < d < 0.06$;
$0 \leq x \leq 1$;
$0 \leq y \leq 1$;
$0 \leq u \leq 1$;
$0 \leq v \leq 0.2$; and
$0.98 \leq m \leq 1.02$;
Formula V wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0 < a < 0.06$;
$0.0001 < b < 0.15$;
$c = 0$;
$0 < d < 0.06$;
$0 \leq x \leq 1$;
$0 \leq y \leq 1$;
$0.1 < u < 0.55$;
$0 \leq v \leq 0.2$; and
$0.98 \leq m \leq 1.02$;
Formula VI wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Y, Sc, La, Ce, Pr, Nd, Sm, Eu, Gd, Tb, Dy, Ho, Er, Tm, Yb and Lu;
$0 < a < 0.06$;
$0.0001 < b < 0.15$;
$c = 0$;
$0.015 < d < 0.06$;
$0 \leq x \leq 1$;
$0 \leq y \leq 1$;
$0.1 < u < 0.55$;
$0 \leq v \leq 0.2$; and
$0.98 \leq m \leq 1.02$; and
Formula VII wherein:
M is at least one alkaline earth selected from the group consisting of Ba and Mg;
W comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, Pr, Nd, Sm, Eu, Gd, Tb, Dy, Ho, Er, Tm, Yb and Lu;
$0 < a < 0.06$;
$0.0001 < b < 0.15$;
$0 < c \leq 0.06$;
$0 < d < 0.06$;
$0 \leq y \leq 1$;
$0.1 < u < 0.8$;
$0 \leq v \leq 0.2$; and
$0.98 \leq m \leq 1.02$;
forming a ceramic slip comprising said dielectric ceramic;
forming a coating of said ceramic slip on a substrate;
printing a pattern of conductive ink on said coating to form a printed coating;
forming a stack comprising said printed coating wherein adjacent printed coatings are offset and alternated printed coatings are registration;
forming a laminate of said stack;
separating said laminate into green chips;
sintering said green chips; and
terminating said sintered green chips.

45. The method of forming a multilayered ceramic capacitor of claim 44 having a temperature characteristic of capacitance within ±1000 ppm/° C. over a temperature range from −55° C. to 150° C.

* * * * *

UNITED STATES PATENT AND TRADEMARK OFFICE
CERTIFICATE OF CORRECTION

PATENT NO. : 11,646,156 B2
APPLICATION NO. : 17/467995
DATED : May 9, 2023
INVENTOR(S) : Hanzheng Guo and Abhijit Gurav Page 1 of 1

It is certified that error appears in the above-identified patent and that said Letters Patent is hereby corrected as shown below:

In the Claims

Claim 1, Column 12, Lines 66-67, between "$0 \leq y \leq 1$;" and "$0 \leq v \leq 0.2$" insert --$0 \leq u \leq 1$--.

Claim 44, Column 22, Line 17, change "W comprising" to "U comprising".

Claim 44, Column 22, Lines 33 and 34, between "$0 < d < 0.06$;" and "$0 \leq y \leq 1$" insert --$0 \leq x \leq 1$--.

Signed and Sealed this
Twenty-seventh Day of June, 2023

Katherine Kelly Vidal
*Director of the United States Patent and Trademark Office*